United States Patent
Kamrani et al.

(10) Patent No.: US 11,170,645 B2
(45) Date of Patent: Nov. 9, 2021

(54) SYSTEMS AND METHODS FOR DETECTING THE LOCATION OF DEBRIS AND UNEXPECTED OBJECTS ON ROADS

(71) Applicant: University of South Florida, Tampa, FL (US)

(72) Inventors: Mohsen Kamrani, Lutz, FL (US); Sisinnio Concas, Temple Terrace, FL (US); Achilleas Kourtellis, Tampa, FL (US)

(73) Assignee: University of South Florida, Tampa (FI)

( * ) Notice: Subject to any disclaimer, the term of this patent is extended or adjusted under 35 U.S.C. 154(b) by 0 days.

(21) Appl. No.: 16/845,128

(22) Filed: Apr. 10, 2020

(65) Prior Publication Data

US 2020/0327807 A1   Oct. 15, 2020

Related U.S. Application Data

(60) Provisional application No. 62/833,322, filed on Apr. 12, 2019.

(51) Int. Cl.
*G08G 1/0967* (2006.01)

(52) U.S. Cl.
CPC ............... *G08G 1/096791* (2013.01)

(58) Field of Classification Search
CPC .................................. G08G 1/096791
USPC ......................................... 340/905
See application file for complete search history.

(56) References Cited

U.S. PATENT DOCUMENTS

| | | | |
|---|---|---|---|
| 7,250,849 B2 * | 7/2007 | Spriggs | E01H 1/00 340/435 |
| 8,884,782 B2 | 11/2014 | Rubin et al. | |
| 8,935,094 B2 | 1/2015 | Rubin et al. | |
| 9,940,832 B2 | 4/2018 | Bansal et al. | |
| 2014/0067265 A1 * | 3/2014 | Maston | G01C 21/3492 701/533 |
| 2014/0160295 A1 * | 6/2014 | Kyomitsu | G08G 1/0112 348/159 |
| 2015/0179066 A1 * | 6/2015 | Rider | G08G 1/166 701/31.5 |

(Continued)

OTHER PUBLICATIONS

Hancock, John A., "High-Speed Obstacle Detection for Automated Highway Applications," The Robotics Institute Carnegie Mellon University, May 1997, 26 pgs.

(Continued)

*Primary Examiner* — Kerri L McNally
(74) *Attorney, Agent, or Firm* — Meunier Carlin & Curfman LLC

(57) ABSTRACT

Systems and methods are described herein to automatically detect objects and other debris located in the road. The lateral movement of a vehicle is monitored to detect lane changes. When a lane change is detected, information about the lane change including geographic coordinates of the lane change are collected. The information collected from various vehicles is correlated to identify possible locations of debris and other objects in the road. The identified locations may be provided to other vehicles for use in one or more navigation or collision detection systems or provided to one or more authorities who may use the information to address the identified objects or debris.

16 Claims, 4 Drawing Sheets

(56) References Cited

U.S. PATENT DOCUMENTS

| | | | | |
|---|---|---|---|---|
| 2015/0356867 A1* | 12/2015 | Bogren | ................ | G08G 1/0116 |
| | | | | 340/905 |
| 2016/0042644 A1* | 2/2016 | Velusamy | ............ | G08G 1/0116 |
| | | | | 340/435 |
| 2018/0068495 A1* | 3/2018 | Chainer | .................. | B60R 11/04 |
| 2018/0164119 A1* | 6/2018 | Becker | ............... | G01C 21/3691 |

OTHER PUBLICATIONS

Goecke, Roland et al., "Towards Detection and Tracking of On-Road Objects," Proceedings of the 2007 IEEE Intelligent Vehicles Symposium, Istanbul, Turkey, Jun. 13-15, 2007, 6 pgs.

Ronald Goecke, et al., Towards Detection and Tracking of On-Road Objects, 2007 IEEE Intelligent Vehicles Symposium, Istanbul, Turkey, Jun. 13-15, 2007.

John A. Hancock, High-Speed Obstacle Detection for Automated Highway Applications, The Robotics Institute Carnegie Mellon University, May 1997.

\* cited by examiner

SYSTEMS AND METHODS FOR DETECTING THE LOCATION OF DEBRIS AND UNEXPECTED OBJECTS ON ROADS

CROSS-REFERENCE TO RELATED APPLICATIONS

This application claims the benefit of priority to U.S. Provisional Patent Application No. 62/833,322 filed on Apr. 12, 2019, entitled "METHOD TO DETECT THE LOCATION AND UNEXPECTED OBJECTS ON ROADS USING BASIC SAFETY MESSAGE DATA AND CONNECTED VEHICLE TECHNOLOGY," the contents of which are hereby incorporated by reference in its entirety.

STATEMENT REGARDING FEDERALLY SPONSORED RESEARCH OR DEVELOPMENT

This invention was made with government support 69A3551747134 awarded by the United States Department of Transportation. The Government has certain rights in the invention.

BACKGROUND

Roadway debris and other unexpected obstructions, such as surface damage can lead to significant traffic delays or worse, crashes. The presence of roadway debris is particularly concerning in high-traffic and high-speed roadways where dense traffic conditions reduce visibility and large volumes of vehicles are exposed to risk. According to Florida's Department of Highway Safety and Motor Vehicles (DHSMV), in 2018 there were 2,949 crashes resulting in 702 injuries and 17 fatalities, where contributing cause was an obstruction in the roadway or debris. Although prevention of the various causes of obstructions and defensive driving can reduce these consequences, the problem cannot be eliminated entirely. Currently, unexpected roadway obstructions are handled by relying on drivers' self-reporting (e.g., through local maintenance departments or the Waze app), which is inefficient and unsafe because it can lead to distracted driving. In addition, pinpointing the exact debris location can be challenging and adds to delays between notifications and actual removal from the responsible transportation agency.

SUMMARY

Systems and methods are described herein to automatically detect objects and other debris located in the road. The lateral movement of a vehicle (i.e., lateral acceleration and or yaw rate) is monitored to detect lane changes. When a lane change is detected, information about the lane change including geographic coordinates of the lane change are collected. The information collected from various vehicles is correlated to identify possible locations of debris and other objects in the road. The identified locations may be provided to other vehicles for use in one or more navigation or collision detection systems or provided to one or more traffic management centers who may use the information to address the identified objects or debris.

The systems and methods described herein provide many advantages over the prior art. First, because objects such as debris and potholes are automatically detected based on lateral acceleration or yaw rate without a driver of the vehicle having to take any action, the there is no burden on the driver to report the objects. This both reduces driver distraction because the driver does not have to manually enter the location of the object while driving and improves the accuracy of object reporting because drivers often incorrectly enter the locations of objects or forget to enter the locations of the objects. Second, because the objects are detected using low cost existing accelerometers, object detection may be performed without the use of expensive visual sensors such as cameras or LIDAR sensors.

In an embodiment, a method for detecting objects on a road is provided. The method includes: monitoring lateral movement of a vehicle by a computing device; based on the monitored lateral movement, detecting a lane change of the vehicle by the computing device; and in response to the detection, collecting data about the lane change including a location of the vehicle on the road by the computing device.

Embodiments may include some or all of the following features. The method may include providing the collected data about the lane change to a server by the computing device. The method may include receiving data indicating the locations of one or more suspected objects on the road. The one or more suspected objects may be debris or potholes. Detecting a lane change by the vehicle may include using one or more of an absolute threshold, a relative threshold, a number of bridging points, a minimum number of consecutive points, and a moving average parameter. The method may include adjusting one or more of an absolute threshold and a relative threshold to exclude the detection of lane changes that are not due to one or more objects on the road. The detected lane change may be due to one or more objects on the road.

In an embodiment, a method for detecting objects on a road is provided. The method includes: receiving a plurality of data about detected lane changes on a road from each vehicle of a plurality of vehicles by a computing device, wherein the data includes a location for each detected lane change on the road; processing the received data to determine locations on the road where one or more objects may be located by the computing device; and storing the determined locations of the objects by the computing device.

Embodiments may include some or all of the following features. The method may further include providing the determined locations of the objects to each vehicle of the plurality of vehicles. The objects may be one or more of debris or potholes. Processing the received data to determine locations on the road where one or more objects may be located may include: calculating a density of the locations from the received data; and determining locations whose densities exceed a threshold as the determined locations on the road where one or more objects may be located. The locations may include geographic coordinates.

In an embodiment, a system for detecting objects on a road is provided. The system may include at least one computing device and a non-tangible computer readable medium. The non-tangible computer readable medium may include instructions that when executed by the at least one computing device cause the at least one computing device to: monitor lateral movement of a vehicle; based on the monitored lateral movement, detect a lane change of the vehicle; and in response to the detection, collect data about the lane change including a location of the vehicle on the road.

Embodiments may include some or all of the following features. The system may further provide the collected data about the lane change to a server. The system may further receive data indicating the locations of one or more suspected objects on the road. The one or more suspected objects may be debris or potholes. Detecting a lane change by the vehicle may include using one or more of an absolute threshold, a relative threshold, a number of bridging points, a minimum number of consecutive points, and a moving average parameter. The system may further adjust one or more of an absolute threshold and a relative threshold to exclude the detection of lane changes that are not due to one or more objects on the road. The detected lane change may be due to one or more objects on the road.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
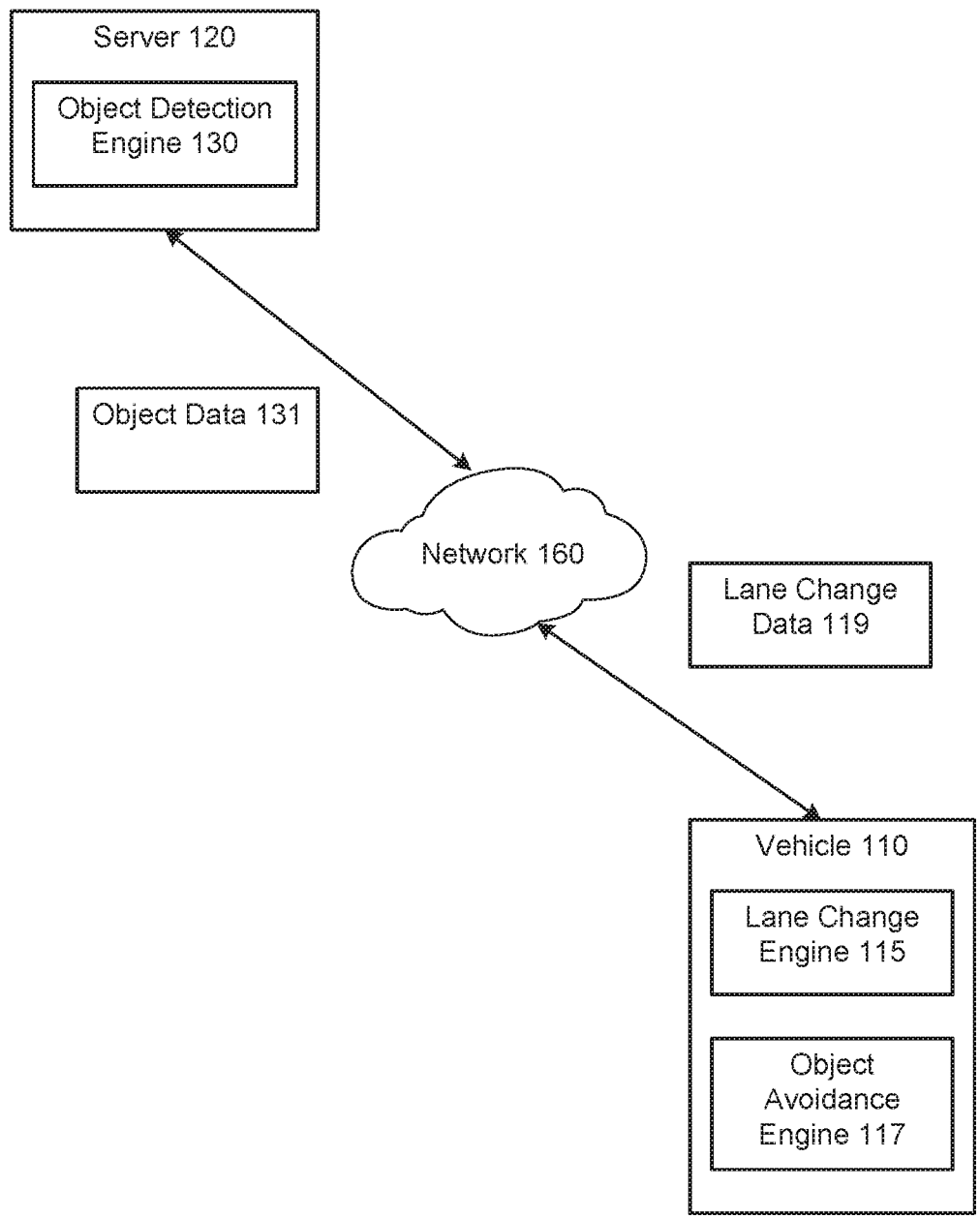
FIG. 1 is an illustration of an exemplary environment for detecting objects such as debris in roads.

FIG. 1 is an illustration of an exemplary environment 100 for detecting one or more objects in roads. The environment 100 may include a plurality of vehicles 110 in communication with a server 120 through a network 160. The network 160 may be implemented using a variety of network types and networking technologies and may include a combination of local private networks (e.g., LANs) and larger public networks (e.g., the Internet). The server 120 and various modules of the vehicle 110 may be implemented using one or more general purpose computing devices such as the computing device 400 illustrated with respect to FIG. 4.

The vehicle 110 may include a lane change engine 115 that is adapted to detect when the vehicle 110 has changed lanes. In some embodiments, the lane change engine 115 may detect that the vehicle 110 has changed lanes by measuring the lateral movement (i.e., the lateral acceleration and yaw rate) of the vehicle 110. As may be appreciated, a sudden or significant change in the lateral movement of the vehicle 110 may indicate that the vehicle 110 has swerved suddenly to avoid an object or hazard in the road currently being traveled. Example objects may include debris (e.g., tree branches or rocks) and potholes. The lateral movement of the vehicle 110 may be determined based on one or more accelerometers located on or inside of the vehicle 110.

In some embodiments, the lane change engine 115 may detect that the vehicle 110 has made a lane change using the following algorithm. First, the algorithm may receive as an input the following parameters including, but not limited to: an absolute threshold, a relative threshold, a number of bridging points, a minimum number of consecutive points, and moving average parameters. More or fewer parameters may be supported. The definition of each parameter is described below.

The absolute threshold may be a maximum value for lateral movement measurements. Any lateral movement values less than this maximum may be flagged as anomalous and disregarded by the lane change engine 115. The absolute threshold value may be set by a user or administrator.

The relative threshold may help the algorithm detect those observations (i.e., lateral acceleration and/or the yaw rate values) that are considerably higher than the mean of a sample. Particularly when the vehicle 110 is driving on a curved road, the values may increase even though no lane change is taking place. To avoid detecting lane changes around curves, the lane change engine 115 may calculate the absolute deviation of individual observations (i.e., lateral acceleration and/or the yaw rate values) and may compare them with the relative threshold. The relative threshold may be set by a user or administrator.

The number of bridging points may be a parameter that is used by the lane change engine 115 to determine the range of points (i.e., lateral acceleration and/or the yaw rate values) that are considered when determining if a lane change took place. Commonly, as per analysis on collected data, there exist a local maximum and local minimum which are detected via the absolute threshold. The sequence of their appearance in the data depends on the direction of the lane change (i.e., right to left vs. left to right) because of positive and negative lateral acceleration and/or the yaw rate definition in the SAE J2735 standard. There are also observations in between, some of which may be flagged through the absolute threshold and the relative threshold described above. However, those lateral acceleration and/or the yaw rate values around zero that are part of a lane change may remain undetected due to their within-normal-range values. Not considering them as a part of lane change may cause an overestimated number of lane changes. Therefore, by setting the number of bridging points, the lane change engine 115 is able address this issue.

The minimum number of consecutive points represents the minimum number of consecutive points (i.e., lateral movement values) that are needed to detect a lane change. This value may be dependent on the resolution of the lateral movement values. For example, if one lateral movement value is generated every second, three lateral movement values that are flagged as associated with a lane change may be enough to determine that a lane change is happening. However, if one lateral movement value is generated every 0.01 seconds, then ten lateral movement values may be required. The minimum number of lateral movement points may be set by a user or administrator.

The moving average parameter may be related to the use of smoothed or raw data. When the moving average parameter is 1 raw data is used. When the moving average parameter is 10 smoother data is used. The moving average may be set by a user or administrator.

Once the initial parameters have been selected, the lane change engine 115 may determine if a vehicle 110 is changing lanes using the following algorithm:

Step one: receive input parameters. The input parameters are the absolute threshold (i.e., abs Threshold); the relative threshold (i.e., relThreshold); the number of bridging points (i.e., numBridgePoint); the minimum number of consecutive points (i.e., minNumConsPoint); and the moving average parameter (i.e., movingAveragePar).

Step two: receive lateral movement value vector(s). The lateral movement vector(s) may be a plurality of lateral acceleration and/or yaw rate values recorded by the vehicle 110. Each value may be associated with a timestamp.

Step three: replace the lateral movement vector(s) with calculated moving average values using movingAveragePar. The calculated moving average values are referred to herein as "x".

Step four: FOR all $x_i \in x$:

(IF: ($x_i \geq$ absThreshold OR $x_i \leq$ −absThreshold)

AND ($|x_i$−mean $(x)| \geq$ relThreshold));

THEN: Flag $x_i$ as an initial members of a lane change.

Step five: IF count of non-flagged observations between two consecutive flagged observations≤numBridgPoint:

THEN: flag those observations in between also as initial members of the lane change.

Step six: FOR each series of lane changes ($LC_j$) IF: length $LC_j \leq$ minNumConsPoint:

THEN: keep LCj as finalized lane change;

ELSE: drop $LC_j$

Step 7: RETURN longitudes and latitudes of finalized lane changes.

As can be seen in step 7, once the lane change engine 115 determines that a set of lateral movement values are associated with a lane change, the lane change engine 115 may provide longitudes and latitudes associated with the lane change to the server 120 via the network 160. The latitudes and longitudes of the lane change are also referred herein as the location of the vehicle 110 and may be determined by a GPS or other location determination component associated with the vehicle 110.

In some embodiments, the lane change engine 115 may provide the location of the vehicle 110 during the detected lane change, and optionally some or all of the lateral movement data, to the server 120 as part of the lane change data 119. The lane change engine 115 may provide the lane change data 119 after each lane change is detected, or the lane change engine 115 may provide the lane change data 119 periodically (e.g., every hour, every day, every week). The frequency at which the lane change data 119 is provided may be set by a user or administrator.

The server 120 may include an object detection engine 130. The object detection engine 130 may receive lane change data 119 from a plurality of vehicles 110 and may process the lane change data 119 to determine one or more objects in the road that were likely responsible for some or all of the lane changes made by the vehicle 110.

In some implementations, the object detection engine 130 may determine objects by first creating a density heat map using the locations associated with lane changes. The density heat map may be a graph. In particular, the density heat map may be a two-dimensional kernel density estimate with an axis-aligned bivariate normal kernel evaluated on a square grid. Other types of graphs and/or maps may be supported.

The object detection engine 130 may use the density heat map to identify the lane changes that are likely due to an object in the road (e.g., a pothole or other debris) and those lane changes that are just normal lane changes made for other purposes (e.g., passing or U-turns). As may be appreciated, the locations associated with lane changes that are due to an object in the road are likely to be denser on the density heat map than the locations that are associated with lane changes that are made for other purposes.

The object detection engine 130 may identify locations (or clusters of locations) on the density heat map whose density exceeds a threshold. The threshold may be set by a user or administrator or may be based on the average density of locations on the density heat map. The object detection engine may then flag each identified location as being associated with an object.

The object detection engine 130 determines the locations of likely objects on one more roads and may provide the determined locations to the vehicles 110 through the network 160. The determined locations may be provided by the object detection engine 130 as part of the object data 131.

The vehicle 110 may further include an object avoidance engine 117 that receives the object data 131 and may use the object data 131 to avoid the locations determined to be associated with one or more objects. For example, the object avoidance engine 117 may provide the object data 131 to a navigation system of the vehicle 110. The navigation system may then recommend routes to the driver of the vehicle 110 that avoids some or all of the locations determined to be associated with one or more objects. The object detection engine 130 may further warn the driver of the vehicle 110 when they are approaching a location determined to be associated with one or more objects or are following route that includes such a location.

The object detection engine 130 may further provide the object data 131 to one or more government agencies who are responsible for maintaining the roads. For example, the object detection engine 130 may provide the object data 131 to the department of transportation, transit authority, local police, and any other agency that may use the locations identified in the object data 131 to investigate and take one or more remedial actions with respect to the detected objects.

Figure 2:
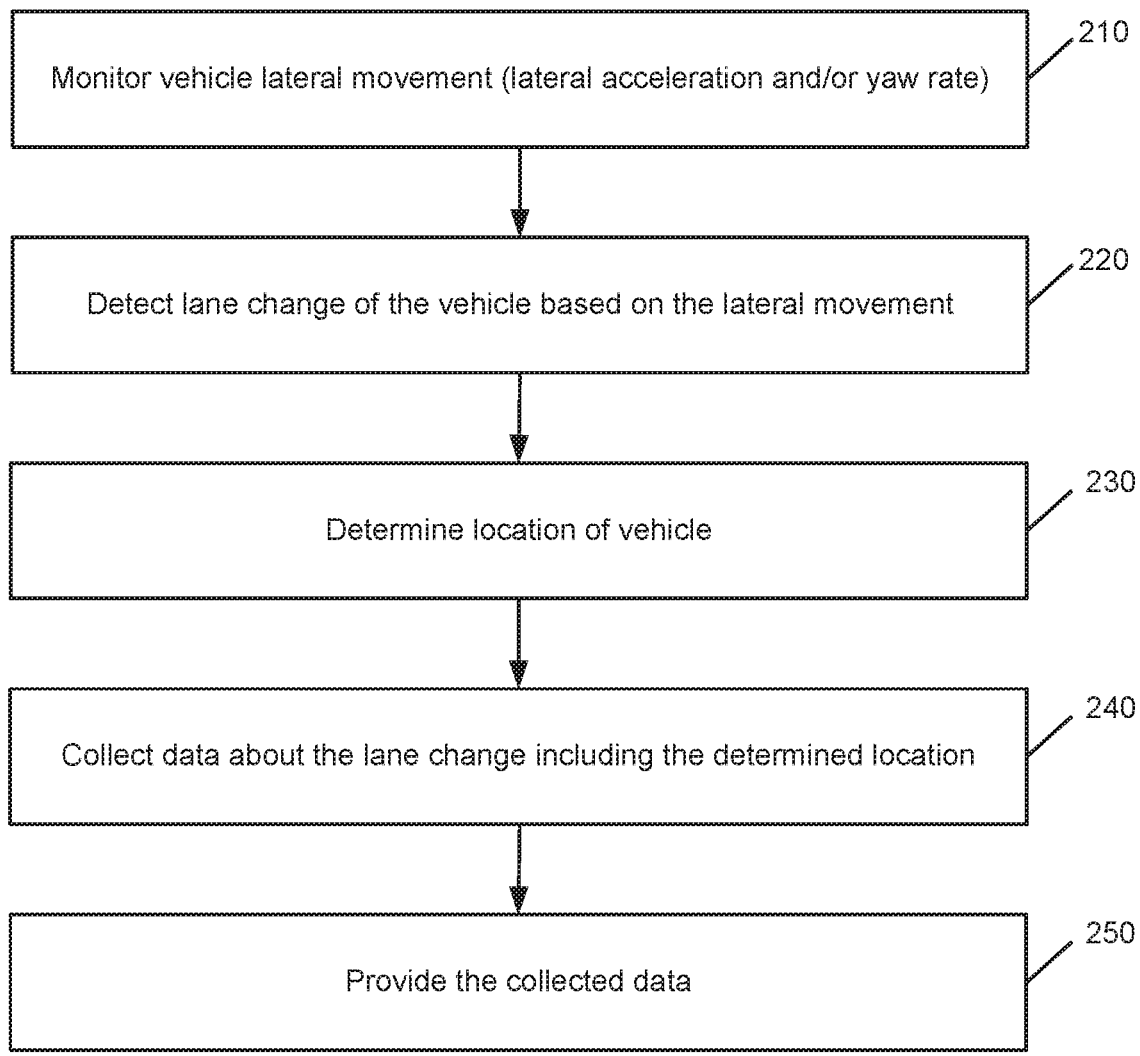
FIG. 2 is an operational flow of an implementation of a method for determining lane changes that may indicate the presence of an object in a road.

FIG. 2 is an operational flow of an implementation of a method 200 for determining lane changes that may indicate the presence of an object in a road. The method 200 may be implemented by the lane change engine 115.

At 210, the vehicle lateral movement is monitored. The lateral movement may include lateral acceleration and yaw rate. The vehicle 110 lateral movement may be monitored by the lane change engine 115. The lateral movement of the vehicle 110 may be monitored to determine when the vehicle 110 is changing lanes. In particular, the lateral movement may be monitored to determine lane changes that are due to the presence of one or more objects in the road such as debris or defects such as potholes.

At 220, a lane change of the vehicle is detected based on the lateral movement. The lane change may be detected by the lane change engine 115 using the lateral movement data collected by the lane change engine 115. In some embodiments, the lane change engine 115 may consider parameters such as the absolute threshold and the relative threshold described above. The lane change engine 115 may adjust the parameters to try and distinguish normal lane changes made in the regular course of driving from sudden or emergency lane changes made to avoid objects or other road defects.

At 230, the location of the vehicle is determined. The location of the vehicle 110 may be determined by the lane change engine 115 of the vehicle 110. The location may be the location of the vehicle 110 at one or more points of the detected lane change such as the beginning, middle, or end of the detected lane change.

At 240, data about the lane change including the determined location is collected. The lane change data 119 may be collected by the lane change engine 115. In some embodiments, the lane change data 119 may be stored by the lane change engine 115.

At 250, the collected data are provided. The collected lane change data 119 may be provided by the lane change engine 115 of the vehicle 110 to the server 120 via the network 120. The server 120 may then use the lane change data 119 collected from a variety of vehicles 110 over time to determine locations on the road that may be associated with objects and/or defects.

Figure 3:
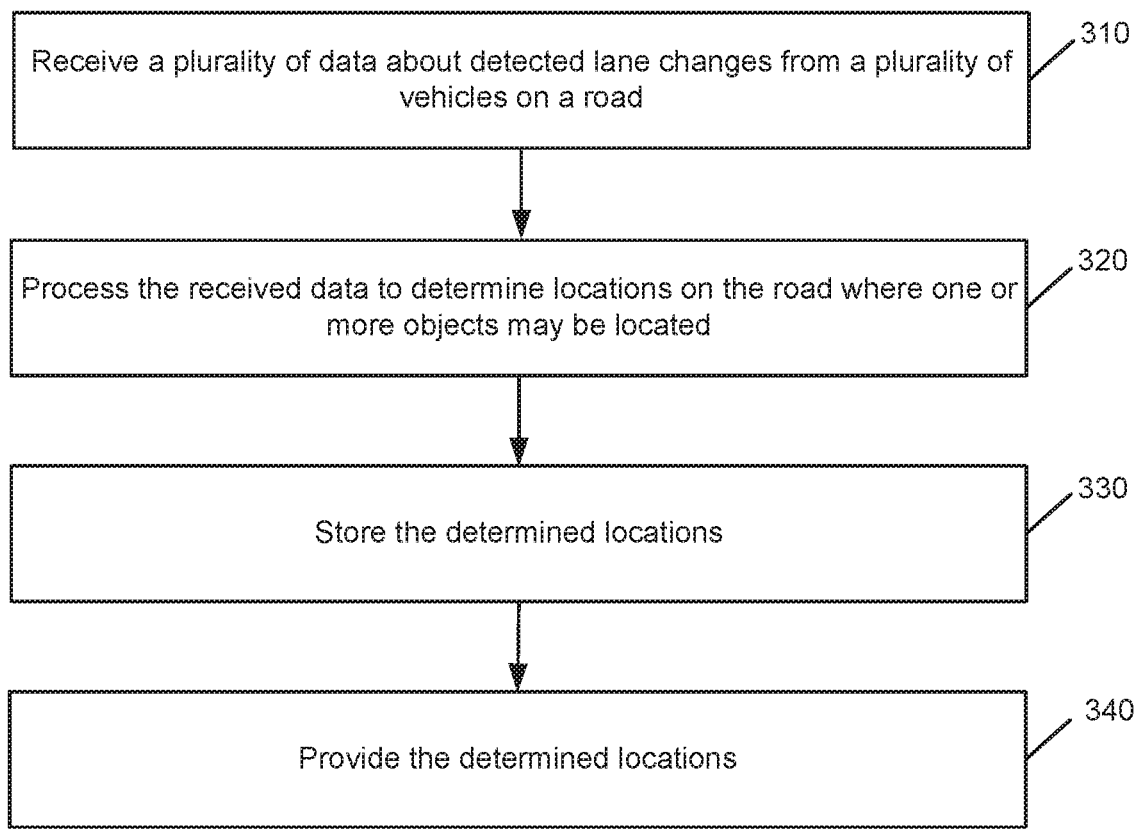
FIG. 3 is an operational flow of an implementation of a method for determining locations on a road where there may be objects or debris based on lane change data provided by a plurality of vehicles.

FIG. 3 is an operational flow of an implementation of a method 300 for determining locations on a road where there may be objects or debris based on lane change data provided by a plurality of vehicles. The method 300 may be implemented by the lane change engine 115.

At 310, a plurality of data about lane changes is received from a plurality of vehicles on a road. The lane change data 119 may be received from the plurality of vehicles 110 through a network 120 by the object detection engine 130. Each vehicle 110 may generate lane change data 119 when it detects a lane change based on the lateral movement of the vehicle 110. The lane change data 119 may include a location for each detected lane change. A lane change may be indicative of the driver of the vehicle 110 swerving to avoid an object in the road, or a road defect such as a pothole. However, a lane change may also be associated with normal driving operations such as passing or making a U-turn.

At 320, the received data is processed to determine locations on the road where one or more objects may be located. The received lane change data 119 may be processed by the object detection engine 130. The object detection engine 130 may determine locations that are associated with objects or defects by determining the locations where multiple lane changes occur on the road. The lane changes associated with these locations are more likely to be associated with objects or road defects than locations with less frequent lane changes. In some embodiments, the object detection engine 130 may generate a density heat map and may determine the locations on the map with a density that is greater than a threshold density as the locations where one or more objects or road defects may be located.

At 330, the determined locations may be stored. The determined locations may be stored by the object detection engine 130 as the object data 131.

At 340, the determined locations are provided. The determined locations may be provided by the object detection engine 130 to the object avoidance engine 117 of the vehicle 110. The object avoidance engine 117 may then use the determined locations to avoid the objects when planning routes for the vehicle 110. Alternatively or additionally, the object detection engine 130 may provide the determined locations to one or more authorities or government agencies who can fix or remove the associated objects.

Figure 4:
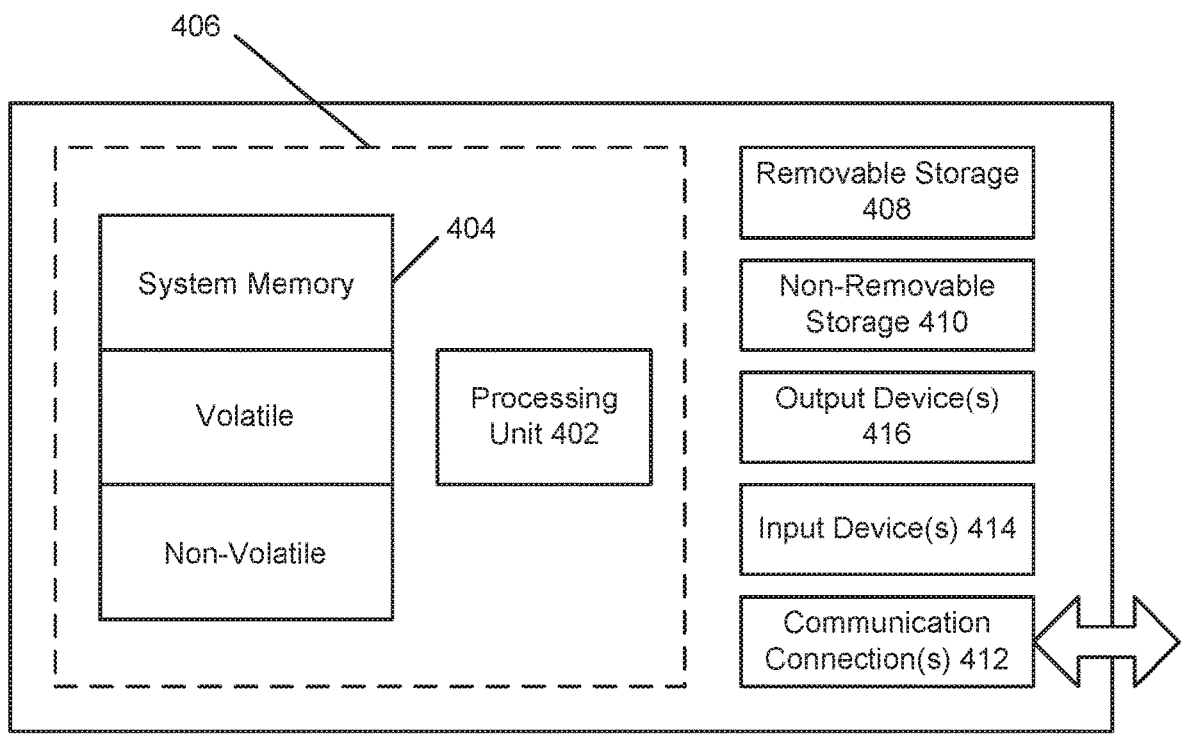
FIG. 4 shows an exemplary computing environment in which example embodiments and aspects may be implemented.

FIG. 4 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 4, an exemplary system for implementing aspects described herein includes a computing device, such as computing device 400. In its most basic configuration, computing device 400 typically includes at least one processing unit 402 and memory 404. Depending on the exact configuration and type of computing device, memory 404 may be volatile (such as random access memory (RAM)), non-volatile (such as read-only memory (ROM), flash memory, etc.), or some combination of the two. This most basic configuration is illustrated in FIG. 4 by dashed line 406.

Computing device 400 may have additional features/functionality. For example, computing device 400 may include additional storage (removable and/or non-removable) including, but not limited to, magnetic or optical disks or tape. Such additional storage is illustrated in FIG. 4 by removable storage 408 and non-removable storage 410.

Computing device 400 typically includes a variety of computer readable media. Computer readable media can be any available media that can be accessed by the device 400 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 404, removable storage 408, and non-removable storage 410 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of computing device 400.

Computing device 400 may contain communication connection(s) 412 that allow the device to communicate with other devices. Computing device 400 may also have input device(s) 414 such as a keyboard, mouse, pen, voice input device, touch input device, etc. Output device(s) 416 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
monitoring lateral movement of a vehicle on a road by a computing device;
based only on the monitored lateral movement, detecting a lane change of the vehicle by the computing device;
in response to the detection, collecting data about the lane change including a location of the vehicle on the road by the computing device; and
adjusting one or more of an absolute threshold and a relative threshold to exclude the detection of lane changes that are not due to one or more objects on the road by the computing device.

2. The method of claim 1, further comprising providing the collected data about the lane change to a server by the computing device.

3. The method of claim 2, further comprising receiving data indicating the locations of one or more suspected objects on the road.

4. The method of claim 3, wherein the one or more suspected objects are debris or potholes.

5. The method of claim 1, wherein detecting a lane change by the vehicle comprises using one or more of the absolute threshold, the relative threshold, a number of bridging points, a minimum number of consecutive points, and a moving average parameter.

6. The method of claim 1, wherein monitoring the lateral movement may include monitoring one or both of lateral acceleration and yaw rate.

7. A method for detecting objects on a road comprising:
receiving a plurality of data about detected lane changes on a road from each vehicle of a plurality of vehicles by a computing device, wherein the data includes a location for each detected lane change on the road;
processing the received data to determine locations on the road where one or more objects may be located by the computing device, wherein processing the received data to determine locations on the road where the one or more objects may be located comprises:
calculating a density of the locations from the received data; and
determining locations whose densities exceed a threshold as the determined locations on the road where the one or more objects may be located; and
storing the determined locations of the one or more objects by the computing device.

8. The method of claim 7, further comprising:
providing the determined locations of the one or more objects to each vehicle of the plurality of vehicles.

9. The method of claim 7, wherein the one or more objects are one or more of debris or potholes.

10. The method of claim 7, wherein the locations comprise geographic coordinates.

11. A system comprising:
at least one computing device; and
a non-tangible computer readable medium storing instructions that when executed by the at least one computing device cause the at least one computing device to:
monitor lateral movement of a vehicle on a road;
based on the monitored lateral movement, detect a lane change of the vehicle;
in response to the detection, collect data about the lane change including a location of the vehicle on the road; and
adjust one or more of an absolute threshold and a relative threshold to exclude the detection of lane changes that are not due to one or more objects on the road.

12. The system of claim 11, further comprising providing the collected data about the lane change to a server.

13. The system of claim 12, further comprising receiving data indicating the locations of one or more suspected objects on the road.

14. The system of claim 13, wherein the one or more suspected objects are debris or potholes.

15. The system of claim 11, wherein detecting a lane change by the vehicle comprises using one or more of the absolute threshold, the relative threshold, a number of bridging points, a minimum number of consecutive points, and a moving average parameter.

16. The system of claim 11, wherein monitoring the lateral movement includes monitoring one or both of lateral acceleration and yaw rate.

* * * * *